United States Patent
Breyer

[19]

[11] Patent Number: 6,138,769
[45] Date of Patent: Oct. 31, 2000

[54] ROOT CUTTING TOOL

[76] Inventor: Stephen R. Breyer, 37 Middle Rd., Southhampton, Mass. 01073

[21] Appl. No.: 09/079,988

[22] Filed: May 15, 1998

[51] Int. Cl.$^7$ ....................................................... A01B 1/00
[52] U.S. Cl. ............................. 172/380; 172/371; 30/277; 111/106; 254/132
[58] Field of Search ........................... 111/106; 172/371, 172/378, 380; 294/61, 49, 51, 59; 30/277; D8/10; 254/132, 131.5; 16/110

[56] References Cited

U.S. PATENT DOCUMENTS

| | | |
|---|---|---|
| 698,715 | 4/1902 | Knight . |
| 1,000,473 | 8/1911 | Wilson .................... 172/371 |
| 1,025,965 | 5/1912 | Deeks . |
| 1,068,346 | 7/1913 | Kilborn . |
| 1,182,918 | 5/1916 | McQuaide ............... 172/378 |
| 1,204,323 | 11/1916 | Sohn ....................... 172/378 |
| 2,436,500 | 2/1948 | Anderson . |
| 2,928,483 | 3/1960 | Trost ....................... 172/378 |
| 3,113,534 | 12/1963 | Wessel . |
| 3,522,965 | 8/1970 | Indzeoski . |
| 3,608,644 | 9/1971 | Ambrose . |
| 3,680,641 | 8/1972 | Hein ........................ 172/371 |
| 4,179,847 | 12/1979 | Osterwalder . |
| 4,271,611 | 6/1981 | Paul . |
| 4,301,605 | 11/1981 | Newman . |
| 4,334,583 | 6/1982 | Parker ................... 172/380 X |
| 4,403,428 | 9/1983 | Chapman, Jr. et al. . |
| 4,625,662 | 12/1986 | Heinzen . |
| 4,637,113 | 1/1987 | Cook ..................... 29/243.54 |
| 4,932,339 | 6/1990 | List ........................ 111/106 |
| 4,951,584 | 8/1990 | Pearce . |
| 5,040,614 | 8/1991 | Nash .................... 172/371 X |
| 5,054,831 | 10/1991 | Ting et al. . |
| 5,156,101 | 10/1992 | Wien . |
| 5,188,340 | 2/1993 | Green . |
| 5,257,666 | 11/1993 | Townsend, Jr. .......... 172/378 |
| 5,360,071 | 11/1994 | Bergendorf . |
| 5,467,830 | 11/1995 | Watson . |
| 5,469,923 | 11/1995 | Visser . |

FOREIGN PATENT DOCUMENTS

| | | | |
|---|---|---|---|
| 100082 | 1/1965 | Denmark ............... 172/380 |
| 577080 | 5/1933 | Germany ............... 172/380 |
| 292723 | 12/1935 | Italy ....................... 111/106 |
| 1012810 | 4/1983 | Russian Federation .............. 172/380 |

OTHER PUBLICATIONS

Publication/Order Page/Catalog, A.M. Leonard, Inc. "Tree Diggers–Augers–Trench Edger/Trimmers".

Publication/Catalog, A.M. Leonard, Inc., "Tree Diggers–Augers–Trench–Edger/Trimmers" Fall, 1993, p. 20.

Publication/Brochure, American Nurseyman Magazine "CareTree," Caretree Systems of Columbus, Ohio.

*Primary Examiner*—Victor Batson
*Attorney, Agent, or Firm*—Fulwider Patton Lee & Utecht, LLP

[57] ABSTRACT

A tool for inserting beneath a plant to sever roots, such as tap roots, that are located beneath a tree or shrub at a location relatively far from the circumference of a root ball, the tool comprising a cutting blade of generally triangular shape having a leading edge which is a relatively narrow cutting edge, and having sides angled inward from the cutting edge. The cutting blade is mounted on a long, slightly arcuate, slender shaft which is sufficiently long to reach under a tree shrub to sever roots and define a root ball in preparation for transplanting the tree or shrub.

9 Claims, 3 Drawing Sheets

FIG. 6
FIG. 8
FIG. 7
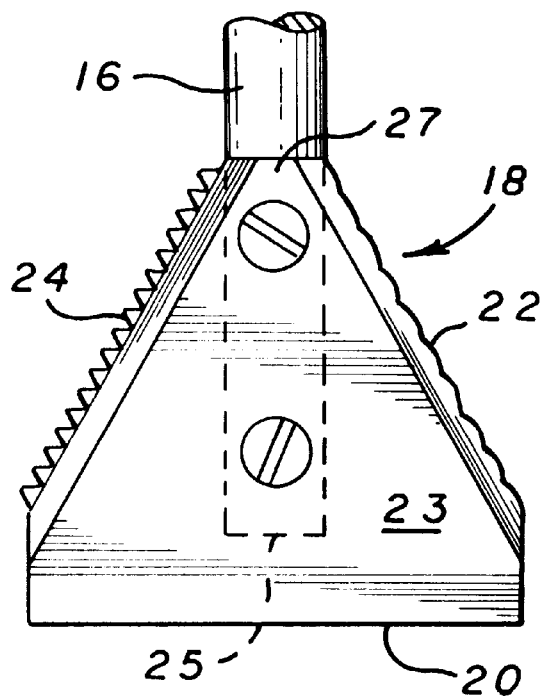
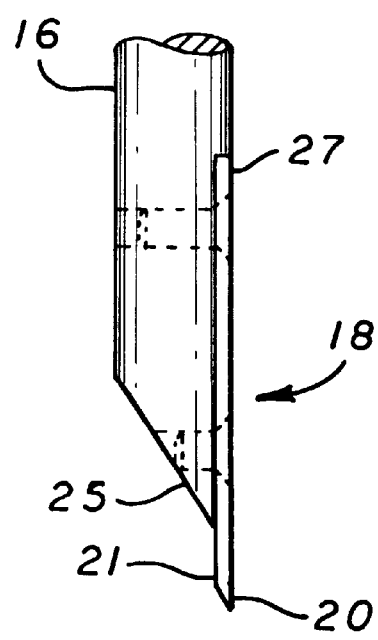
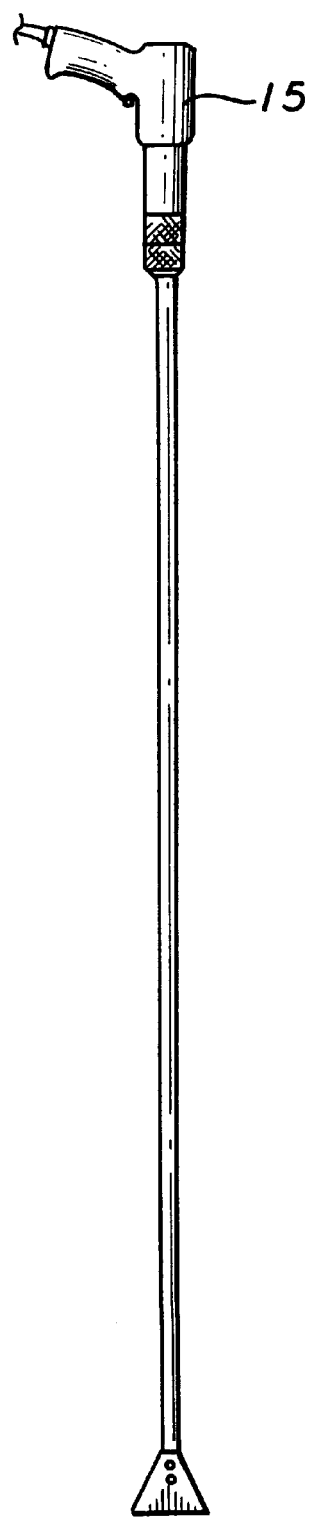

ROOT CUTTING TOOL

BACKGROUND OF THE INVENTION

This invention relates to a tool for cutting subterranean roots while digging a root ball for transplanting a tree, shrub or other plant, and more particularly, to a tool for cutting roots located beneath the center of an area to be excavated in forming a root ball for transplanting a tree, shrub or other plant.

Digging and transplanting trees and shrubs which have been grown in the ground (generally referred to as field-grown stock to distinguish from container-grown stock) is an important part of the nursery and landscaping business. Field-grown trees and shrubs, whether growing in a nursery or elsewhere, are generally transplanted to another location using either the bare root technique or the balled and burlapped ("B&B") technique. The tool of the invention may be useful in practicing the bare root technique, but is particularly useful in practicing the B&B technique.

In transplanting trees and shrubs using the bare root technique, the root system of the plant to be transplanted is isolated and the soil around those roots is loosened by digging around the plant with a hand spade or the like. The plant is then removed from the ground and the soil is removed from the root system. The plant with its bare root system may then be transplanted. The bare root technique is generally appropriate only for small, dormant deciduous trees and shrubs up to about 6 feet tall or small, dormant evergreens up to about 1 foot tall. While this technique has the advantage of producing specimens for transplanting that are relatively light and easy to handle, it is generally not an appropriate technique for many plants, especially the larger trees and shrubs, that a nurseryman or landscaper may want to transplant.

Trees and shrubs of relatively large size are generally transplanted along with a root ball made of the roots of the plant extending for some distance from the base of the trunk, and the soil surrounding those roots. This excavated volume of roots and soil is generally referred to as a root ball. For handling during transplanting, the root ball may be lifted from the ground and then groomed to trim the projecting roots at the periphery of the root ball and to remove excess soil. The resultant root ball is generally wrapped in burlap or other similar material to protect the root ball. Thus, this method of digging and transplanting trees and shrubs is referred to as the balled and burlap method or "B&B" method. It is sometimes the case, especially when the tree or shrub is replanted immediately after digging to a nearby location, that plant may be transplanted directly without wrapping the root ball in burlap. For purposes of this application, however, if a significant root ball is dug and transplanted, the method is still referred to as the B&B method even though the root ball is not wrapped in burlap. Although a seemingly simple process, careful and successful transplantation by the B&B technique may be time consuming and quite arduous if done using tools available in the prior art.

The first task of the nurseryman is proper sizing of the root ball. The roots of trees and shrubs typically radiate outward and downward from the crown (the point where the trunk and roots meet). Tree and shrub roots tend to be concentrated near the ground surface; even large trees have most of their roots within the upper 16 inches of soil. Many trees and shrubs, however, will also have some major roots which extend deeply downward from the crown to gather nutrients and water from the lower levels in the soil and serve the important purpose of helping to anchor the plant securely.

Before digging a tree or shrub it is necessary to determine how large a portion of the root systems needs to be dug. The root ball (the soil containing the portion of the root system which will be kept with the tree or shrub) is usually roughly upside-down hemispherical in shape, and centered around the base of the trunk of the tree or shrub. The depth of the root ball is generally not more than half its diameter and may be less. The root ball is generally 10 to 12 times the diameter of the trunk of the tree or shrub as measured just above the basal flair of the trunk. A tree or shrub dug with a root ball of this size will generally transplant satisfactorily and avoid undue transplant shock.

In order to enhance the quality and viability of the root ball, a technique known as root pruning is often employed. A dense, compact root system concentrated near the crown is highly desirable for stock which is to be transplanted. Including a relatively large portion of the root system in the root ball will enhance the viability of the tree or shrub to withstand the stress of transplanting and will effectively knit the root ball together making a mechanically solid root ball which is relatively more likely to remain intact during transplanting. This later characteristic is important since fracturing of crumbling of the root ball is likely to damage the root system within it.

Root pruning is a procedure which can help trees and shrub develop a dense, compact root system concentrated near the crown. In root pruning, roots which extend beyond the circumference of the area which is to be the root ball are cut while leaving the plant in the ground. Trees and shrubs typically respond to root pruning by growing an abundance of new, fine, roots extending from the remaining roots within the root ball. To gain the benefit of root pruning, sufficient time should be allowed between root pruning and transplanting for the growth of the new roots to occur. The length of this time varies depending upon a variety of factors such as soil temperature and the size and kind of tree or shrub involved. Significant root regrowth can occur within a little as a week after pruning. However, it is often desirable to allow a much longer period of time, even as much as one year or more, between root pruning and transplanting.

Root pruning may occur in two steps to avoid undue damage to the overall root system of a tree or shrub. Initially, about ⅔ to ¾ of the circumference of the root ball can be root pruned. After allowing some time for the root system to recover, the remainder of the root ball can be pruned. Root pruning in two stages is most advisable when dealing with larger sizes of trees or shrubs, or with kinds of trees or shrubs which are difficult to transplant. Properly executed, root pruning encourages the development of dense, compact root systems, even in species of plants which naturally tend to have diffuse root systems.

Although, as stated above, the root ball at the surface is generally 10 to 12 times the diameter of the trunk, it is a good idea to root prune a somewhat smaller ball, generally around a circumference of only 8 to 10 times the diameter of the trunk. Doing so reduces the loss of fine new roots which develop near the periphery of the root ball following root pruning.

The tools currently available to the nurseryman in transplanting a tree or shrub by the B&B technique include a nursery spade, and certain mechanical devices such as a U-blade type digger and a multiple blade type digger. A U-blade type digger has a single large blade in the shape of a bucket or scoop with a forward edge in the shape of a "U" or a "V." The blade is mounted on a tractor, backhoe, or similar device. In use, the blade is positioned so that the forward edge of the blade is pointed down into the ground just outside the outline of the root ball to be dug. The blade is then driven down into the ground and simultaneously rotated under the plant so that it essentially scoops the root ball into the blade.

A multiple blade type digger is also mounted on a tractor, backhoe or similar device. It has two or more, usually triangular, broad blades that may be positioned around the outline of a root ball to be dug and angled towards the center of the plant. The blades are mechanically driven downward into the ground so that they meet under the plant and essentially enclose the root ball within the blades.

Root Pruning

Prior to the invention, root pruning, the advantages of which are described above, was generally accomplished using a nursery spade. Nursery spades are designed so their blades penetrate the soil readily and generally have a straight leading edge which tends to slice through roots which it encounters rather than pushing them aside.

One way to root prune a tree or shrub with a spade is to insert the spade, angled at about 20 to 35° from the vertical into the ground in a circular path around the plant. The spade is inserted to the full depth of the blade. Care should be taken to overlap successive strokes of the blade slightly so that all the roots within reach of the spade are cut. While the blade is fully inserted, the handle may be pushed downwards slightly until the root ball shows a bit of movement. For small root balls (less than 18 inches in diameter), the root ball can often be broken completely free of the surrounding soil in this way. As the root ball diameter increases over approximately 18 inches, however, the difficulty of breaking the roots which extend downward from the center of the plant increases markedly. For such root balls, the roots at the center are likely to remain intact.

Except in the case of very small root balls as described above, when the procedure described in the preceding paragraph is used the root ball is only partially root pruned and the benefits of root pruning are only partially realized. Also, where uncut roots remain after pruning, when the root ball is torn free by prying with a spade for transplanting, the force required often causes the root ball to crumble and the roots to be torn rather than cut cleanly. Such torn roots often heal more slowly than cleanly cut roots, and are more subject to invasion by disease organisms.

Another approach to root pruning with the spade is to dig a trench around the prospective root ball to a depth of about ⅔ the depth of the root ball. Once the trench has been dug, the spade may be positioned at the inner bottom corner of the trench and angled at 40 to 60° from the vertical. It may then be inserted and the process repeated around the fall circumference of the root ball to effectively cut all of the roots extending downward from the plant. The larger the proposed root ball, the wider and deeper the trench will need to be in order to properly prune the root ball. Properly executed, this procedure results in a neat, thorough job of root pruning, but is very laborious and time consuming and requires a large volume of soil, often greater than the volume of the root ball itself, to be removed.

Root pruning to some extent may also be achieved using the mechanical devices described above, the U-blade type digger and the multiple blade type digger. Using a U-blade digger, it is usually best to insert the blade twice, once each from directions close to 180° apart. This requires that access to the tree or shrub be unusually good so that the tractor, backhoe or similar device can have access to the plant from both of two opposite sides. Furthermore, the U-blade has a broad, relatively dull, slow moving blade that tends to encounter a number of roots simultaneously and to tear or mangle them rather than cutting them cleanly. Consequently, it generally does a rather ragged job of cutting the roots. As a result, even when transplanting with a U-blade type digger, it is often desirable or necessary to perform the root pruning using a nursery spade.

Multiple blade type diggers can also be used for root pruning. This is done by inserting the blades under the plant to cut the roots and then removing the blades without lifting the plant. However, as with the U-blade diggers, a multiple blade type digger tends to push and tear roots rather than cutting them cleanly. Additionally, multiple blade type diggers are complicated and expensive; in sizes suited to larger root balls they are very expensive. Multiple blade type diggers do not cope well with obstacles such as stones in the soil and may fail to cut roots on the lowest part of the root ball. As with the U-blade type diggers, it is also necessary to have access to the plant by the rather large and cumbersome mechanical equipment necessary for operation of the multiple blade type diggers.

Digging for Transplanting

With or without prior root pruning, trees and shrubs must be dug from the ground if they are to be transplanted. Prior to the invention, this was often done using a nursery spade. The nursery spade is used to separate the root ball, which is generally larger than the volume defined by root pruning, from the surrounding soil. Unless a small root ball is being dug, this requires digging the soil from around and under the plant to expose most of the periphery of the root ball for wrapping. If the root ball is relatively large, mechanical means may be necessary to lift the root ball even after it has been prepared by digging with a nursery spade.

Alternatively, a U-blade type digger may be used to finish digging and lifting the plant. As described above, the bucket or scoop is positioned outside the root ball defined by root pruning with the forward edge of the blade pointed down into the ground. The blade is then driven down into the ground and simultaneously rotated under the plant so that it essentially scoops the root ball into the bucket formed by the blade. The bucket with the root ball in it may be mechanically lifted out of the ground, deposited on material such as burlap for wrapping, or moved directly to the chosen location for transplanting.

In multiple blade type diggers, the two or more triangular blades are positioned around the diameter of the root ball, generally outside the volume defined by root pruning, and angled inward. The blades are then driven into the ground so that they meet beneath the center of the tree or shrub. The blades may be mechanically interlocked to strengthen the rigid container formed when they are in place under the root ball. The root ball and plant may then be lifted up and out of the ground by the power supplied by, for example, tractor mounted hydraulic equipment.

SUMMARY OF THE INVENTION

This invention is directed to a tool for root pruning and digging root balls for successful transplanting, and provides a simple, inexpensive and relatively environmentally benign system for performing these tasks. The invention comprises a narrow cutting face located on a blade carried on the distal end of a long narrow shaft. The narrow shaft is in the form of a long, slender, slightly arcuate rod. A handle located on the proximal end of the shaft aids in proper placement and positioning of the shaft for insertion into the ground. A foot rest may be located on the shaft or at the juncture of the handle and the shaft so that insertion force may be applied to the handle by forcing the handle forward with the arms and to the shaft by forcing the shaft forward using a foot. Alternatively, a reciprocating power source such as a pneumatic hammer may be employed to apply force to the shaft.

The cutting blade may be generally triangular with a relatively narrow cutting front edge forming the base and with sides which may be sharpened or have toothed or serrated edges that angle inward to where the blade is fastened to the shaft.

In use, the area that will form the root ball is defined by making by a generally circular cut around the tree or shrub to be transplanted at the appropriate radius from the trunk using a nursery spade or the like. The blade of the invention is then inserted into the circular cut and driven down and under the plant at least until it is advanced under the center of the plant, severing all roots in its path. It is then withdrawn, and reinserted a small distance further around the circular cut. Successive stokes of the blade should overlap slightly so all the roots are cut. This process is repeated until the tool has been inserted entirely around the plant, and thus a root ball has been fully defined under the plant with the roots severed around the periphery of the entire root ball, including the ball rest directly under the trunk of the plant. The triangular shape of the cutting blade facilitates the removal of the tool after insertion, and the sharpened, toothed or serrated side edge may further facilitate the removal of the blade after it has been inserted under the plant.

The root ball thus defined may be immediately lifted, groomed and covered with burlap, or may be left in place to allow the root system of the plant to regenerate roots to compensate for those lost in the digging process. When appropriate, the plant may then be lifted, and the root ball may be groomed and covered with burlap for handling during transplanting.

The invention is particularly suited for use with environmentally benign methods of lifting and transporting plants such as the Tree and Shrub Lifting System shown in U.S. Pat. No. 5,496,143 issued to the inventor herein and incorporated herein by reference.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 6 is a front plan view of the blade of the root cutter of the invention attached to the distal end of the shaft of the invention;

FIG. 7 is a side view of the blade of the root cutter of the invention attached to the distal end of the shaft of the invention; and FIG. 8 is an embodiment of the root cutter of the invention having a reciprocating pneumatic driver.

DETAILED DESCRIPTION

Figure 2:
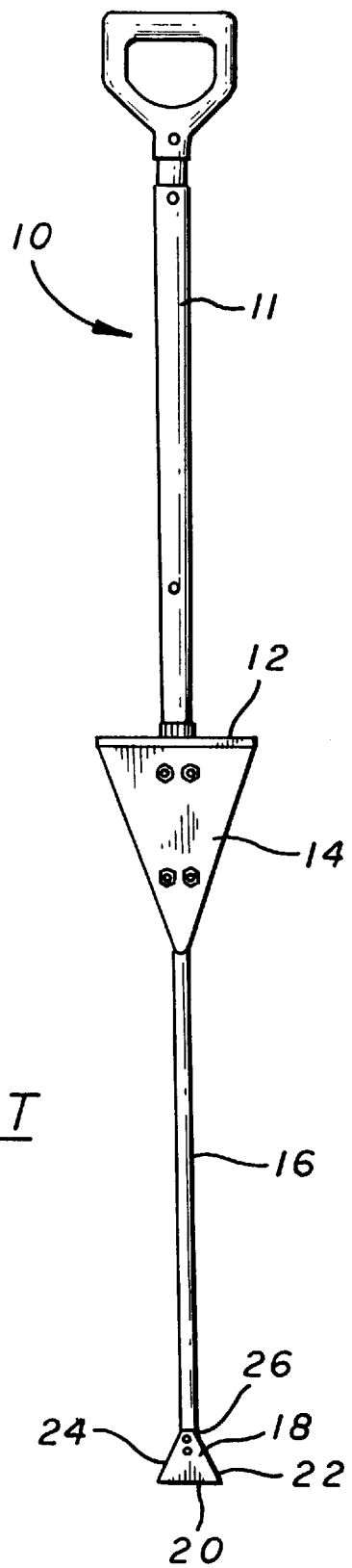
FIG. 2 is a front plan view of the root cutter of the invention.
Figure 3:
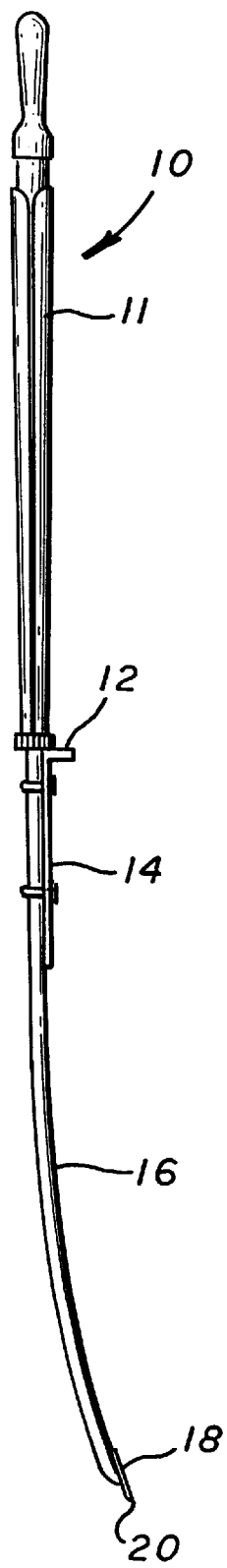
FIG. 3 is a side plan view of the root cutter of the invention.

According to the present invention, and referring specifically to FIGS. 2 and 3, a root cutter 10 is provided having a handle 11 attached at its distal end to a slender elongate shaft 16. The handle may be made of wood and may be about 28½ inches long.

At the junction between the handle and the slender, arcuate shaft, a foot pad 12 may be attached. The foot pad may be a horizontal extension from a vertical metal plate 14. Alternatively, where the root cutter is designed to be attached to a source of power such as a pneumatic driver 15 as shown in FIG. 8, the foot pad may be omitted.

The shaft may be in the form of round steel rod about ⅝ inches in diameter, and is preferably slightly arcuate along its length and is substantially rigid. The shaft may be 30 inches long between the handle and the tip of the shaft.

Referring particularly to FIGS. 6 and 7, at the distal end of the slender shaft, a cutting blade 18 is attached. The cutting blade preferably has a relatively straight leading edge 20 that serves as the cutting portion of the blade as the root cutter is inserted into the soil and the blade comes in contact with a root. The leading edge is generally about 3 inches wide. The leading edge is sharpened by grinding away the lower surface 21, while the upper surface 23 remains relatively planar. Thus as the blade is advanced forward in the soil, the configuration of the leading edge causes the blade to be pushed upwards by the soil, which in turn tends to exert force on the end of the slender rod in a generally upward direction. This is the same direction as the slightly arcuate curve of the slender rod, so that as the root cutter is advanced under the plant to be dug, it tends to advance along a generally arcuate line.

The blade 18 may be generally triangular in shape with the leading edge 20 forming the base and the side edges 22, 24 converging toward apex 27. The side edges are each about 3½ inches long. The apex is fastened to the distal portion of the shaft 16. In this way, the side edges do not form a sharp angle that would tend to snag roots or rocks as the blade is withdrawn from the soil. Additionally, the side edges may be sharpened, serrated (22) or toothed (24) to facilitate easy withdrawal.

Referring to FIGS. 6 and 7, the blade 18 is attached to the distal portion of the slender shaft 16 by well known fastening means such as screwing or welding. The distal tip of the rod 25 is angled toward the blade so that a smooth attachment is formed. Alternatively, the shaft and blade may be integrally formed by casting or other shaping means. A relatively smooth transition between the shaft and the blade aids in the insertion of the tool into the soil, and withdrawal from the soil without snagging roots, rocks or other impediments. For a similar reason, the blade surface may be inset into the shaft (FIG. 6) to avoid forming an edge at the transition between the shaft and the proximal end 27 of the blade as shown in FIG. 7.

The blade 18 is preferably made of a rigid steel plate material, and about 1/16 inch thick except for the sharpened edges. A slightly thicker blade, for example, ⅛ inch, might be preferred with a mechanical power source. The trailing edge 22, 24 may be sharpened and serrated or toothed.

The shaft, which may be a steel rod, is of sufficient hardness to flex in use without becoming permanently bent or otherwise deformed. The shaft is also thin, to facilitate easy insertion and removal. A round steel shaft ⅝ inches in diameter has been found to be appropriate. Alternative cross-sectional shapes, such as square or octagonal and alternative material including other metal alloys, composite material, or plastic is also acceptable as long as the material used is sufficiently strong to drive the blade without breaking, and may follow the generally arcuate path of the cut 42, 48 formed by the insertion of the root cutter under the plant, without the shaft being permanently bent or broken.

Figure 1:
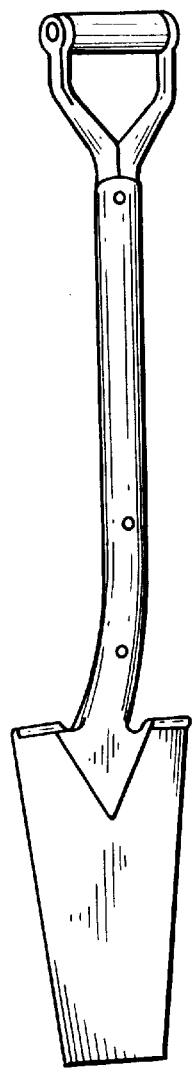
FIG. 1 is a front perspective view of a common nursery spade of the prior art.
Figure 4:
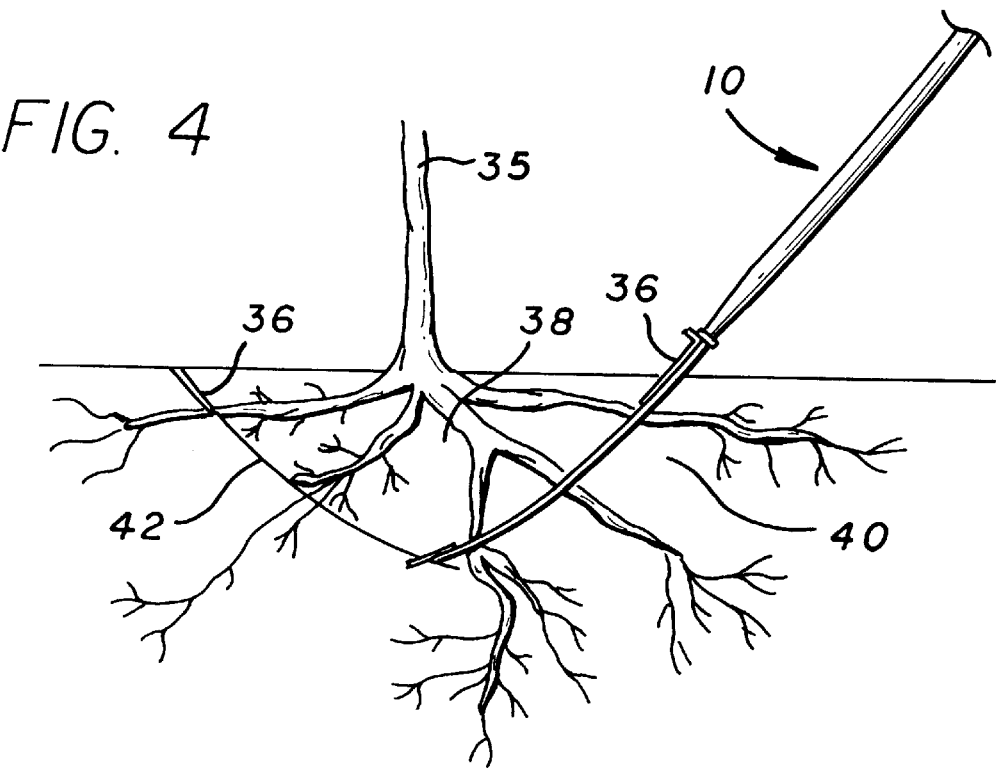
FIG. 4 is a side cut-away view of the root cutter of the invention inserted beneath a plant for root pruning.

Referring now to FIG. 4, in use, a cut 36 around a tree or shrub to be dug for transplanting is made by, for example, digging around the plant with a nursery spade. The nursery spade may sever roots near the surface. A typical nursery spade as shown in FIG. 1 will have a blade about 12 to 16 inches long, so the initial cut, usually at an angle, will be about that long. In larger trees or shrubs, a significant number of the roots which extend downward from the plant will remain uncut. The root cutter 10 is then inserted into the soil around the plant generally following the slit cut by the nursery spade, and pushed fully under the plant. A useful total length for the root cutter has been found to be about 5 feet. As it is advanced, it will sever any roots it encounters. Because the blade is narrow it will encounter few roots at a time; because it has a sharp forward end and usually moves relatively quickly, it is relatively successful in cutting them cleanly; because the shaft is slender and the cutting edge relatively narrow, the root cutter can often bypass rocks and other obstructions without seriously disturbing the surrounding soil.

The root cutter is then withdrawn, moved around the slit made by the nursery spade a small distance, usually about the same distance as the length of the leading edge 20, and then reinserted. Since the leading edge is relatively narrow, it will be necessary to insert the root cutter repeatedly until it has been inserted around the entire circumference of the plant. By the use of this method, a root ball, including the portion of the root structure and attached soil directly beneath the plant, is cut free from the surrounding soil without significantly disrupting the soil and roots within the root ball.

The tree or shrub may then be immediately lifted out of the ground and transplanted. Alternatively, this first root cutting procedure may be in the nature of root pruning, and a second root cutting procedure may be performed for digging and transplanting.

Figure 5:
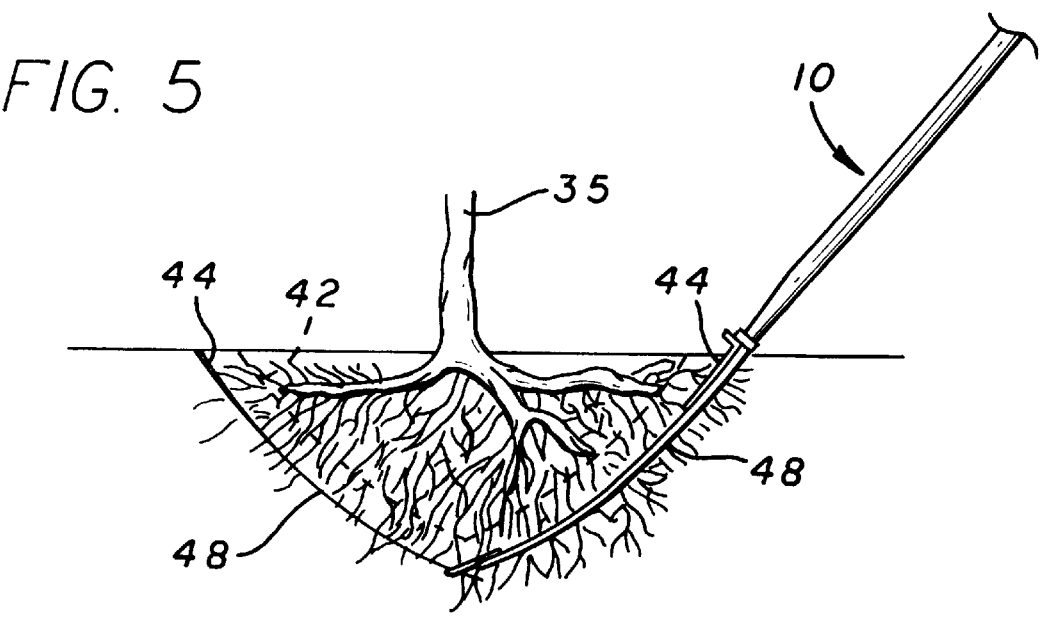
FIG. 5 is a side cut-away of the root cutter of the invention inserted beneath a plant to dig a root ball for transplanting.

As illustrated in FIG. 5, if the tree or shrub is left in its original location for some time after root pruning, the root system may generate a dense network of new roots to compensate for roots lost with the first cut. After the root ball has been formed by root pruning along the root pruning cut 42, the digging procedure described above is repeated wherein the root cutter is inserted repeatedly in slightly overlapping strokes while advancing around a circumference 44 to cut a root ball free of the surrounding soil for transplanting. When this two cut method is employed, the second cut 48 defining the root ball is generally made slightly further away from the trunk (the root ball preferably being made around a circle 10 to 12 times the diameter of the trunk of the tree or shrub as measured at a point just above the flare of the crown) than was the first cut pruning the roots (the root pruning cut preferably being made around a circle 8 to 10 times the diameter of the trunk of the tree or shrub at a point just above the flare of the crown) and defines a root ball with an outer surface larger than that defined by root pruning.

In either case, after the plant is lifted out of the ground from its original location, the root ball may be groomed around its periphery and possibly wrapped in burlap for transport to the location where it is to be transplanted.

By use of the root cutter of this invention in the manner described above, a root ball of a relatively large field grown tree or shrub may be cut away from the surrounding soil to allow successful B&B transplanting without the need to provide access to the tree or shrub by a tractor, back hoe or other similarly environmentally disruptive heavy machinery. When used in conjunction with manual lifting and transporting tools, for example the Tree and Shrub Lifting System described in U.S. Pat. No. 5,496,143, a particularly efficient but environmentally benign method for transplanting trees, shrubs or other plants is provided.

While a particular form of the invention has been illustrated and described, it will be apparent that various modifications can be made without departing from the spirit and scope of the invention.

What is claimed is:

1. A root cutter for cutting roots and defining a root ball for transplanting, the root cutter comprising:
   a handle;
   a shaft having a proximal end attached to the handle and a distal end;
   a narrow cutting blade, said cutting blade having a length measured between a proximal end of the blade and a leading edge of the blade, the proximal end of the blade being narrower than the leading edge of the blade, the blade also having side edges, said leading edge sharpened to define a root ball and said side edges converging toward the proximal end of the blade, and
   an arcuate shaft connected to the distal end of the shaft and extending to and connected to the proximal end of the narrow cutting blade, the arcuate shaft having a forward side oriented away from a user, the arcuate shaft being at least 24 inches in length and longer than the length of the narrow cutting blade, the arcuate shaft also being curved in a forwardly direction, the arcuate shaft cooperating with the cutting blade when the cutting blade penetrates the surface of the earth around a plant such that the path of the cutting blade through the earth defines a curve as the blade is advanced through the earth cutting the roots of the plant to define a root ball at least 24 inches in diameter when the distal end of the shaft is level with the surface of the earth without harming the plant so that the plant may be transplanted to another location.

2. A root cutter as in claim 1, wherein said leading edge is sharpened by grinding away a lower surface of said leading edge, to angle said lower surface toward an upper surface of said leading edge.

3. A root cutter as in claim 1, wherein said side edges of said cutter blade are sharpened.

4. A root cutter as in claim 3, wherein said side edges of said cutter blade are serrated.

5. A root cutter as in claim 3, wherein said side edges of said cutting blade are toothed.

6. A root cutter as in claim 1, wherein said arcuate shaft is a metal rod sufficiently stiff to allow the arcuate shaft to penetrate the earth and flex in use without permanently deforming.

7. A root cutter as in claim 1, further comprising a foot pad, said foot pad attached to said root cutter approximately at a junction between the straight shaft and the arcuate shaft.

8. A root cutter as in claim 1, further comprising a mechanically operated driver attached to said handle.

9. A root cutter as in claim 8, wherein said driver is a reciprocating pneumatic driver.

\* \* \* \* \*